(12) United States Patent
Scicluna et al.

(10) Patent No.: US 7,342,780 B2
(45) Date of Patent: Mar. 11, 2008

(54) DATA STORAGE DEVICE CARRIER AND METHOD

(75) Inventors: Mark Scicluna, Long Sutton (GB);
Paul Alan Bushby, Lancing (GB);
Adam Wade, Rowlands Castle (GB)

(73) Assignee: Xyratex Technology Limited, Hampshire (GB)

( * ) Notice: Subject to any disclaimer, the term of this patent is extended or adjusted under 35 U.S.C. 154(b) by 307 days.

(21) Appl. No.: 11/076,135

(22) Filed: Mar. 10, 2005

(65) Prior Publication Data

US 2005/0220578 A1    Oct. 6, 2005

Related U.S. Application Data

(60) Provisional application No. 60/552,743, filed on Mar. 15, 2004.

(51) Int. Cl.
*G06F 1/16* (2006.01)
(52) U.S. Cl. .................................... 361/685
(58) Field of Classification Search ................ 361/685; 312/223.1, 223.2
See application file for complete search history.

(56) References Cited

U.S. PATENT DOCUMENTS

| | | | |
|---|---|---|---|
| 5,552,946 A | | 9/1996 | Bicknese et al. |
| 5,564,804 A | * | 10/1996 | Gonzalez et al. ........ 312/223.2 |
| 5,768,099 A | * | 6/1998 | Radloff et al. ............... 361/685 |
| 6,015,196 A | * | 1/2000 | Welch et al. ............. 312/223.2 |
| 6,034,868 A | * | 3/2000 | Paul ........................... 361/684 |
| 6,179,397 B1 | * | 1/2001 | Liao ........................ 312/223.2 |
| 6,377,449 B1 | * | 4/2002 | Liao et al. .................. 361/685 |
| 6,556,432 B2 | * | 4/2003 | Chen et al. .................. 361/685 |
| 6,612,667 B2 | * | 9/2003 | Tsai et al. ................ 312/223.1 |
| 6,853,547 B2 | * | 2/2005 | Williams et al. ............ 361/685 |
| 2003/0222550 A1 | | 12/2003 | Boswell et al. | |

FOREIGN PATENT DOCUMENTS

EP    0 834 879 A1    4/1998

* cited by examiner

*Primary Examiner*—Lisa Lea-Edmonds
(74) *Attorney, Agent, or Firm*—Pillsbury Winthrop Shaw Pittman LLP

(57) ABSTRACT

In one aspect, a carrier (10) for a data storage device has a base (22) and side walls (23,24) upstanding from the base (22). A runner (25) is provided on at least one side wall (23,24) for sliding engagement with a runner (12) of a chassis (1) in which the carrier (10) is in use mounted. The carrier runner (25) is on the edge of the at least side wall (23,24) that is opposite the base (22). The width of the carrier runner (25) generally transverse to the side wall (23,24) is greater than the thickness of the at least one side wall (23,24). In another aspect, a carrier (10) for a data storage device has a base (22) and side walls (23,24) upstanding from the base (22). The material of the carrier (10) is resilient. The carrier (10) is arranged such that the carrier (10) can grip a data storage device between the side walls (23,24).

14 Claims, 4 Drawing Sheets

DATA STORAGE DEVICE CARRIER AND METHOD

CROSS REFERENCE TO RELATED APPLICATION

This application claims the benefit of priority to U.S. application Ser. No. 60/552743, filed Mar. 15, 2004, the content of which is hereby incorporated by reference.

The present invention relates to a data storage device carrier and to a method of mounting a data storage device in a carrier.

As is well known, data storage devices, such as disk drive units, are used to store data. In many applications, plural data storage device are mounted in carriers that are housed in a single chassis and which are removable therefrom for maintenance or replacement of the data storage devices as and when necessary. In practice, it is desirable to fit as many data storage devices in a single chassis as possible in order to save space. A typical known chassis of standard 19" (approx. 48 cm) rack width and height of 3U (5¼", approx. 13 cm) may hold 12 or 15 data storage devices at most, the devices being arranged in a regular array. A more recent chassis, which can hold 16 data storage devices, is disclosed in our US-A-2003/0222550, the entire content of which is hereby incorporated by reference. In each case, the data storage devices are hard disk drives each having a hard disk having a standard nominal diameter of 3.5" (approx. 9 cm).

More recently, hard disk drives having a hard disk with a standard nominal diameter of 2.5" (approx. 6 cm) have become widely available and have been used in laptop computers and the like. There is a growing desire to use plural 2.5" hard disk drives housed in a single chassis, to replace the 3.5" hard disk drives which have historically been used. Inevitably, there is a desire to fit as many of the 2.5" hard disk drives in a chassis of standard width and height as possible.

A number of difficulties arise in the design of a chassis of this type, particularly when trying to accommodate a greater number of data storage devices in their carriers in a standard volume because space is at a premium.

For example, conventionally the disk drive carriers have been made of relatively thick material, such as cast metal or plastics. The conventional carriers have a base portion with side walls upstanding therefrom. The underneath of the base and the upper free edges of the side walls respectively slide on runners or other guide strips provided in the enclosure or chassis in which the disk drives in their carriers are mounted in use. When trying to accommodate more disk drives in their carriers in a chassis, it is necessary to reduce the thickness of the walls of the carriers. One effect of this is that the upper free edges of the side walls become relatively sharp and can cut through or at least remove material from the chassis runners. It will be appreciated that it is highly undesirable to have debris or swarf within the chassis, particularly when the debris is metal particles.

Moreover, there is generally a desire to make assembly of a disk drive carrier faster and easier.

According to a first aspect of the present invention, there is provided a carrier for a data storage device, the carrier comprising a base, side walls upstanding from the base, and a runner on at least one side wall, the runner being on the edge of the at least side wall that is opposite the base for sliding engagement with a runner of a chassis in which the carrier is in use mounted, the width of the carrier runner generally transverse to the side wall being greater than the thickness of the at least one side wall.

In this way, even if the side walls are relatively thin, a relatively wide surface is provided at the (upper free) edges of the or each side wall. This means that a wide surface is presented to the chassis runner(s) on which the carrier slides as it is moved into and out of the chassis, which prevents the carrier cutting into the chassis runner and thus retains the integrity of the chassis runner and avoids production of swarf.

In a preferred embodiment, a carrier runner is provided on each side wall on the edge that is opposite the base.

In a preferred embodiment, the or each carrier runner is formed by bending over the edge of the side wall that is opposite the base. This provides a very cost-effective and simple way of providing the carrier runner(s). The whole carrier can be formed by stamping of a sheet of metal or other suitable material to form a generally rectangular sheet, and then folding over the edge of the or each side wall to form the carrier runner.

In a preferred embodiment, the material of the carrier is resilient and the carrier is arranged such that the carrier can grip a data storage device between the side walls. This provides for very quick and simple assembly of a data storage device into the carrier and may avoid the need to screw the carrier to the data storage device altogether (though it may be desirable or necessary in some circumstances additionally to screw the carrier to the data storage device).

Preferably, the side walls in the rest position of the carrier slope towards each other on moving away from the base and can be flexed apart to receive and grip a data storage device therebetween.

The carrier may have at least one internally facing projection for engagement in a recess or through hole in a data storage device received in use in the carrier to retain a said data storage device in the carrier. The one or more projections can be used to secure the data storage device to the carrier in the correct position, and may be used instead of or in conjunction with screws and instead of or in conjunction with a resilient carrier that grips the data storage device unit as described above.

A said projection may be provided on a side wall of the carrier. Alternatively or additionally, a said projection may be provided on the base of the carrier.

There may be provided in combination, a carrier as described above and a data storage device chassis having a bay in which the carrier is slidably receivable, the chassis having walls at least one of which has a runner along which the carrier runner slides as the carrier is slid into and out of the bay.

According to a second aspect of the present invention, there is provided a carrier for a data storage device, the carrier comprising a base, and side walls upstanding from the base, the material of the carrier being resilient and the carrier being arranged such that the carrier can grip a data storage device between the side walls.

Again, this provides for very quick and simple assembly of a data storage device into the carrier and may avoid the need to screw the carrier to the data storage device altogether (though it may be desirable or necessary in some circumstances additionally to screw the carrier to the data storage device).

Preferably, the side walls in the rest position of the carrier slope towards each other on moving away from the base and can be flexed apart to receive and grip a data storage device therebetween.

The carrier may have at least one internally facing projection for engagement in a recess or through hole in a data storage device received in use in the carrier to retain a said data storage device in the carrier. A said projection may be provided on a side wall of the carrier. Alternatively or additionally, a said projection may be provided on the base of the carrier.

According to another aspect of the present invention, there is provided in combination, a carrier as described above and a data storage device received therein.

According to another aspect of the present invention, there is provided a method of mounting a data storage device in a data storage device carrier, the carrier having a base, and side walls upstanding from the base, the material of the carrier being resilient and the carrier being arranged such that the carrier can grip a data storage device between the side walls, the method comprising: flexing the side walls apart from each other to allow a data storage device to be received in the carrier; inserting a data storage device in the carrier; and, releasing the side walls so that the side walls grip the data storage device.

This method provides very quick and simple assembly of a data storage device into the carrier and may avoid the need to screw the carrier to the data storage device altogether (though it may be desirable or necessary in some circumstances additionally to screw the carrier to the data storage device).

The side walls in the rest position of the carrier preferably slope towards each other on moving away from the base.

Embodiments of the present invention will now be described by way of example with reference to the accompanying drawings, in which.

Figure 1:
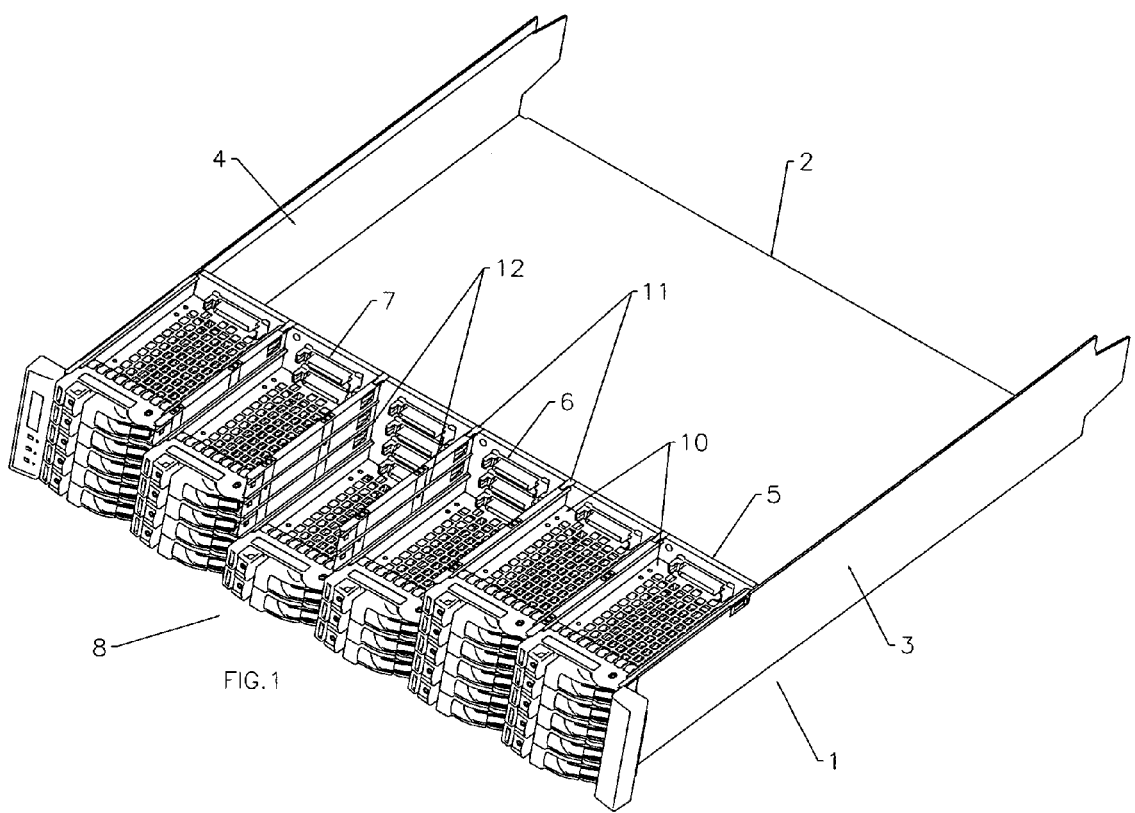
FIG. 1 shows schematically a perspective view of a data storage device chassis with the top removed in order to show plural disk drive carriers.

Referring first to FIG. 1, there is shown a portion of a data storage device chassis 1 having a base 2 and side walls 3,4. In this example, the data storage devices are disk drive units. The top of the chassis 1 is omitted from FIG. 1 for clarity. The chassis 1 has a backplane 5 which generally divides the chassis 1 into a front portion, where the disk drives and carriers are located, and a rear portion, where electronics and power supplies and the like are located. The backplane 5 provides electrical and data connections 6,7 for disk drives mounted in use in the chassis 1.

In the first or front end 8 of the chassis 1 there are mounted plural disk drive carriers 10. Again for reasons of clarity, the disk drives themselves are not shown in FIG. 1. In this example, thirty carriers 10 are arranged in six columns of five carriers 10 each to fit in the standard 19 inch rack size having a height of 2U. The carriers 10 can be inserted into and removed from the front end 8 of the chassis 1.

As is conventional, the chassis 1 has a number of dividing walls 11 which, together with the side walls 3,4 of the chassis 1, define the columns of bays for the disk drive carriers 10. Again as is conventional, each of the dividing walls 11 and the front parts of the side walls 3,4 have plural guide strips or runners 12 which define the individual bays for the disk drive carriers 10 and also provide running surfaces on which the carriers 10 slide as the carriers 10 are slid into and out of the chassis 1. In order to provide for efficient vibration damping and also to ensure that the connectors 6,7 on the backplane 5 mate properly with the connectors on the rear of the disk drives, the carriers 10 are a snug fit in the bays.

Figure 2:
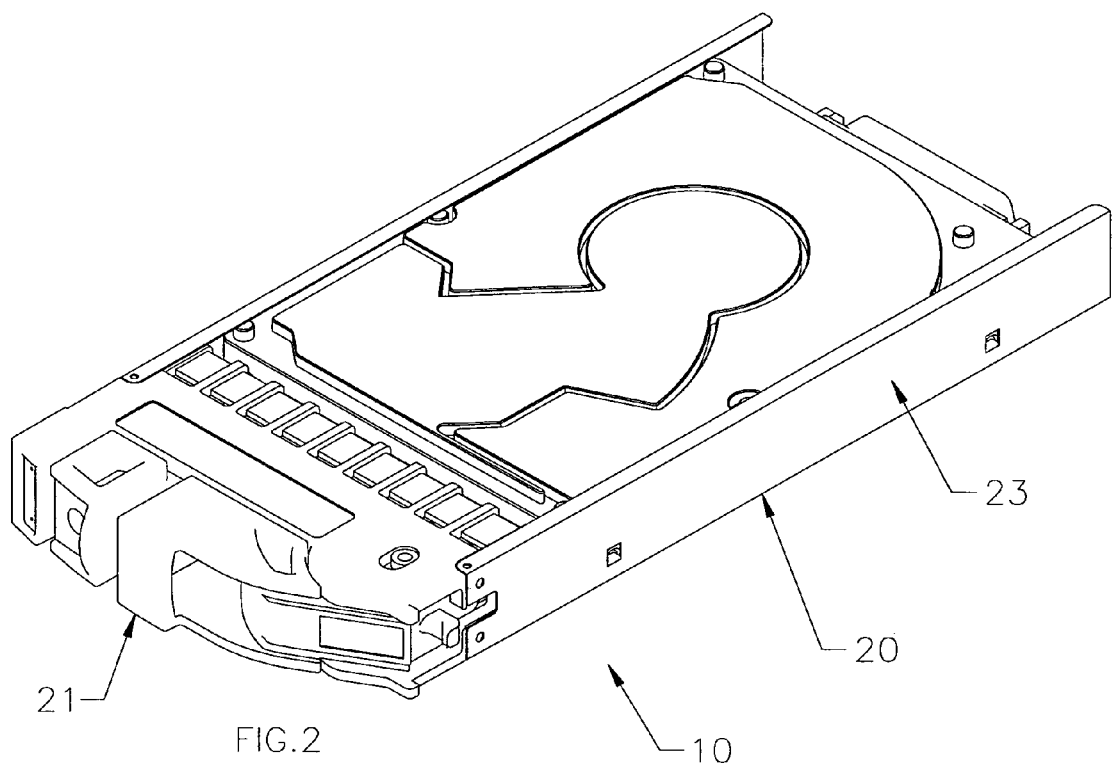
FIG. 2 is a perspective view of an assembled disk drive carrier with disk drive unit.
Figure 3:
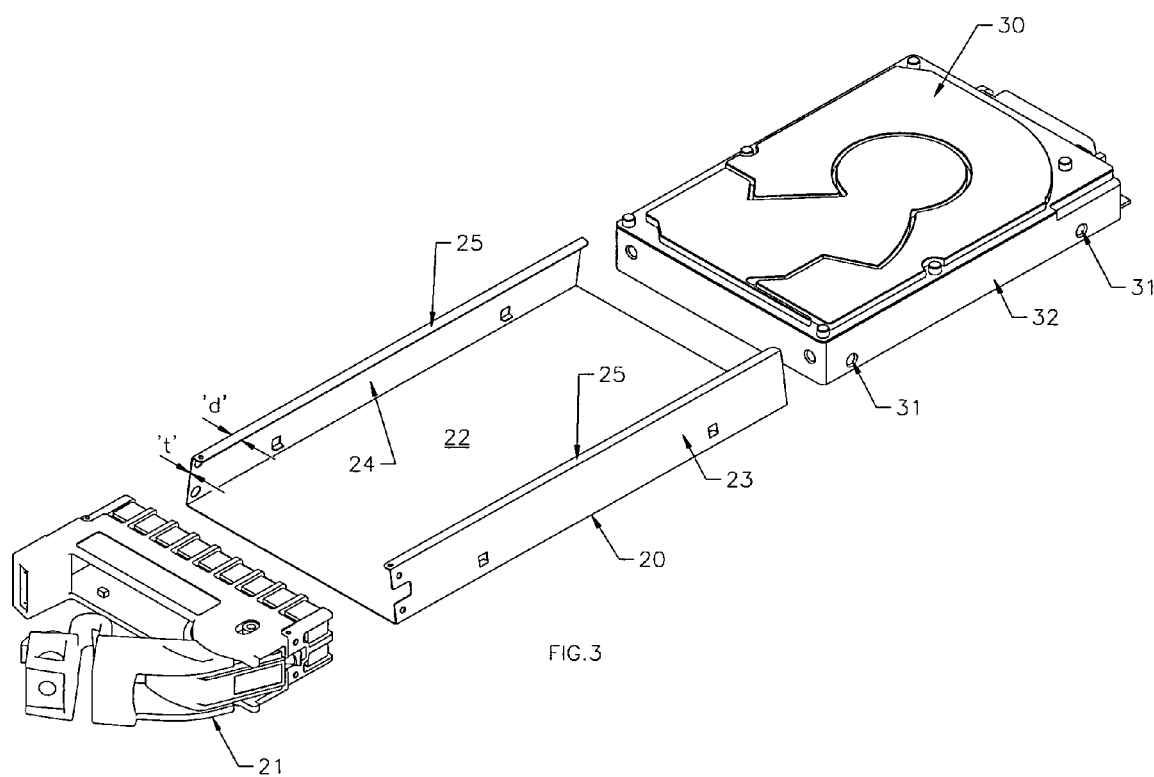
FIG. 3 is an exploded view corresponding to FIG. 2.
Figure 4:
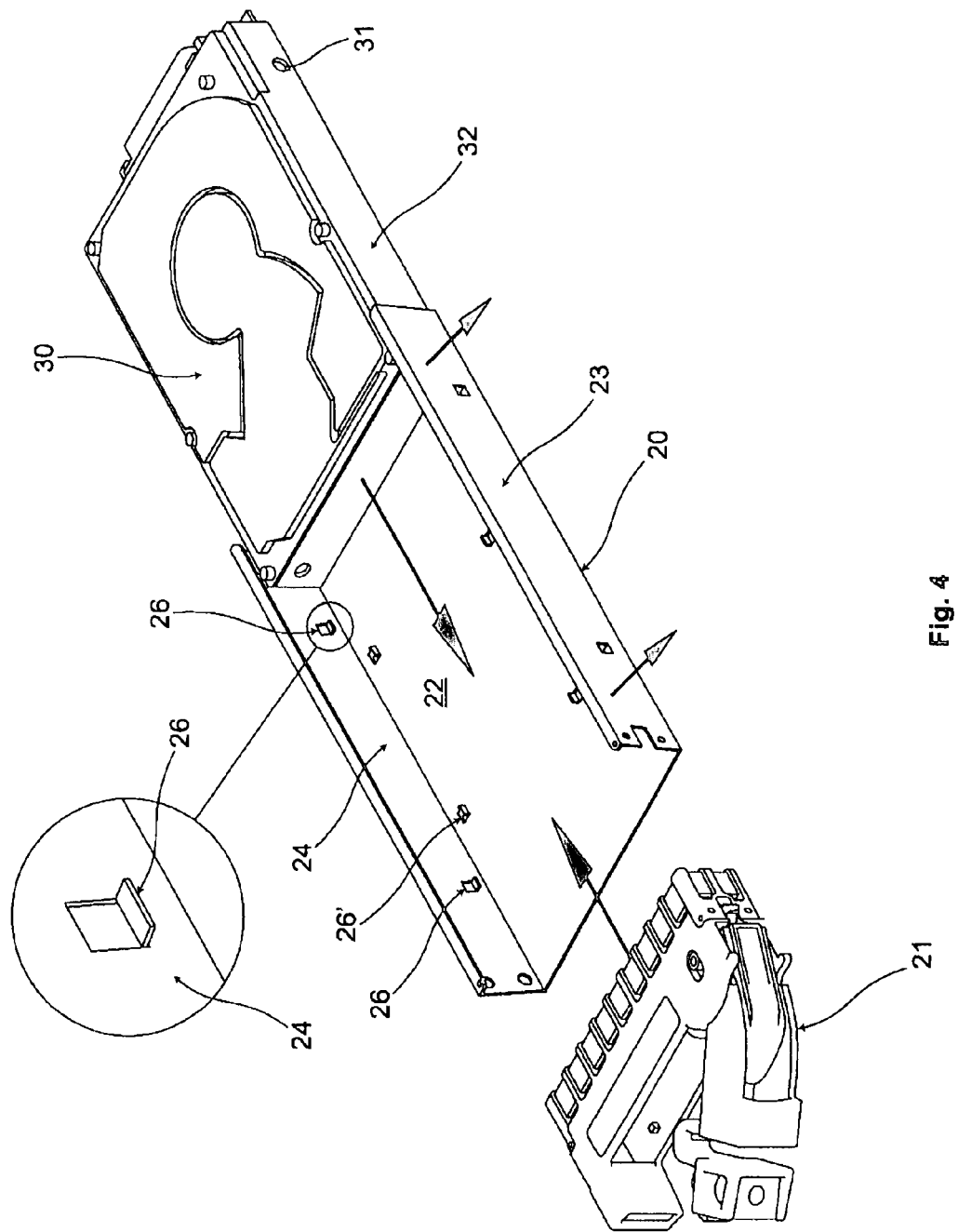
FIG. 4 is a perspective view corresponding to FIGS. 2 and 3 showing assembly of the parts.

Reference is now made to FIGS. 2 to 4 which show a carrier 10 in more detail. The carrier 10 has a carrier wrap 20 and a carrier front block 21 which includes a releasable latch mechanism which operates to releasably secure the carrier 10 in the chassis 1.

The carrier wrap 20 has a rectangular base 22. Side walls 23,24 extend along the long edges of the base 22, each side wall 23,24 having an upper free edge 25 which is opposite the base 22. The upper free edge 25 of each side wall 23,24 has a width d generally transverse to the side wall 23,24 in which the width d is relatively wide and is wider than the thickness t of the side wall 23,24. This means that the surface that is presented to the chassis runners 12 is a relatively wide carrier runner 25, which means that the carrier runner 25 will not normally cut into the chassis runners 12. This prevents the sliding action of the carrier 10 in the chassis 1 removing material from the chassis runners 12 and thereby prevents damage to the chassis 1 and production of swarf or other debris. The thickness t of the side walls 23,24 may be about 0.25 mm, whereas the width d of the carrier runners 25 may be 3 mm.

The carrier wrap 20 can be formed relatively simply by for example plastics moulding. However, it is preferred that the carrier wrap 20 be formed by stamping a generally rectangular sheet of metal, such as stainless or spring steel, and then folding twice at each long edge. The first fold forms the side walls 23,24 and the second fold forms the carrier runners 25. It will be understood however that other arrangements are possible. For example, it may be that the carrier runners 25 are provided initially as separate items which are then fixed, such as by gluing or welding, to the side walls 23,24 of the carrier wrap 20.

Conventionally, a disk drive unit 30 is fixed in a carrier by screws which pass through through-holes provided in the side walls of the carrier and into screw holes 31 provided in the side walls 32 of the disk drive unit. This operation is typically carried out manually and is in any event time-consuming. A number of features of the preferred carrier wrap 20 avoid these problems.

First, in the preferred carrier wrap 20, the side walls 23,24 of the carrier wrap 20 taper inwardly on moving away from the base 22. A suitable angle for the taper will easily be determined by the person skilled in the art, but is preferably less than 10° and more preferably in the range 3° to 5°. In conjunction with the resilient nature of the preferred material used for the carrier wrap 20, this means that the side walls 23,24 of the carrier wrap 20 can grip the disk drive unit 30. This is indicated schematically in FIG. 4 which shows the side walls 23,24 being held apart (either manually or by a robot or the like) whilst the disk drive unit 30 is inserted, the side walls 23,24 then being released to enable the side walls 23,24 to grip the disk drive unit 30 once the disk drive unit 30 is in the correct position. The front block 21 is preferably inserted whilst the carrier side walls 23,24 are held apart so that the side walls 23,24 grip the front block 21 at the same time as gripping the disk drive unit 30.

Alternatively or additionally, the side walls 23,24 have inwardly facing projections or tangs 26 which are positioned so as to correspond to the screw holes 31 conventionally provided in the side walls 32 of the disk drive unit 30. These projections 26 engage in the holes 31 in the side walls 32 of the disk drive unit 30. This helps to retain the disk drive unit 30 securely in the carrier wrap 20, and also helps to ensure that the disk drive unit 30 is secured in the correct position in the carrier wrap 20. It will be appreciated that one or more projections 26 may be used in conjunction with one or more screws that fit into screw holes 31 in the disk drive unit 30 if desired or deemed necessary. The projections 26 in the preferred embodiment are simply formed during the stamping process which provides the basic carrier wrap 20. In addition to or instead of projections 26 on one or more of the side walls 23, 24, one or more similar projections 26' may be provided on the base 22 of the carrier wrap 20.

It will be understood that the relatively wide carrier runners 25, preferably formed by folding over the side walls 23,24 of the carrier wrap 20, the resilient carrier wrap 20 with inwardly tapering side walls 23,24, and the one or more inwardly facing projections 26, may be used together or separately or in various combinations.

Embodiments of the present invention have been described with particular reference to the example illustrated. However, it will be appreciated that variations and modifications may be made to the examples described within the scope of the present invention.

The invention claimed is:

1. A carrier for a data storage device, the carrier comprising a base, side walls upstanding from the base, and a runner on at least one side wall, the runner being on the edge of the at least one side wall that is opposite the base for sliding engagement with a runner of a chassis in which the carrier is in use mounted, the width of the carrier runner generally transverse to the side wall being greater than the thickness of the at least one side wall, the material of the carrier being resilient and the carrier being arranged such that the carrier can grip a data storage device between the side walls, wherein the side walls in the rest position of the carrier slope towards each other on moving away from the base and can be flexed apart to receive and grip a data storage device therebetween.

2. In combination, a carrier according to claim 1 and a data storage device received therein.

3. A carrier for a data storage device, the carrier comprising a base, side walls upstanding from the base, and a runner on at least one side wall, the runner being on the edge of the at least one side wall that is opposite the base for sliding engagement with a runner of a chassis in which the carrier is in use mounted, the width of the carrier runner generally transverse to the side wall being greater than the thickness of the at least one side wall, wherein the carrier has at least one internally facing projection for engagement in a recess or through hole in a data storage device received in use in the carrier to retain a said data storage device in the carrier.

4. A carrier according to claim 3, wherein a said projection is provided on a side wall of the carrier.

5. A carrier according to claim 3, wherein a said projection is provided on the base of the carrier.

6. In combination, a carrier according to claim 1 and a data storage device chassis having a bay in which the carrier is slidably receivable, the chassis having walls at least one of which has a runner along which the carrier runner slides as the carrier is slid into and out of the bay.

7. A carrier for a data storage device, the carrier comprising a base, and side walls upstanding from the base, the material of the carrier being resilient and the carrier being arranged such that the side walls of the carrier grip a data storage device between the side walls.

8. In combination, a carrier according to claim 7 and a data storage device received therein.

9. A carrier for a data storage device, the carrier comprising a base, and side walls upstanding from the base, the material of the carrier being resilient and the carrier being arranged such that the carrier can grip a data storage device between the side walls, wherein the side walls in the rest position of the carrier slope towards each other on moving away from the base and can be flexed apart to receive and grip a data storage device therebetween.

10. A carrier for a data storage device, the carrier comprising a base, and side walls upstanding from the base, the material of the carrier being resilient and the carrier being arranged such that the carrier can grip a data storage device between the side walls, wherein the carrier has at least one internally facing projection for engagement in a recess or through hole in a data storage device received in use in the carrier to retain a said data storage device in the carrier.

11. A carrier according to claim 10, wherein a said projection is provided on a side wall of the carrier.

12. A carrier according to claim 10, wherein a said projection is provided on the base of the carrier.

13. A method of mounting a data storage device in a data storage device carrier, the carrier having a base, and side walls upstanding from the base, the material of the carrier being resilient and the carrier being arranged such that the carrier can grip a data storage device between the side walls, the method comprising:

flexing the side walls apart from each other to allow a data storage device to be received in the carrier;

inserting a data storage device in the carrier; and, releasing the side walls so that the side walls grip the data storage device.

14. A method according to claim 13, wherein the side walls in the rest position of the carrier slope towards each other on moving away from the base.

* * * * *